United States Patent [19]
Aharoni et al.

[11] Patent Number: 5,422,746
[45] Date of Patent: Jun. 6, 1995

[54] SINGLE AND MULTIPLE ELEMENT HOLOGRAPHIC DEVICES FOR HIGH-EFFICIENCY BEAM CORRECTION

[75] Inventors: Abraham Aharoni, Palo Alto; Joseph W. Goodman, Los Altos, both of Calif.; Yaakov Amitai, Rehovot, Israel

[73] Assignee: Board of Trustees of the Leland Stanford Jr. University, Stanford, Calif.

[21] Appl. No.: 944,160

[22] Filed: Sep. 11, 1992

[51] Int. Cl.⁶ .............................................. G02B 5/32
[52] U.S. Cl. ........................................ 359/16; 359/8; 359/12; 359/15; 359/30
[58] Field of Search .................... 359/8, 12, 15, 16, 30

[56] References Cited

U.S. PATENT DOCUMENTS

| | | | |
|---|---|---|---|
| 3,600,056 | 8/1971 | King, Jr. | 359/12 |
| 3,752,557 | 8/1973 | Belvaux | 359/12 |
| 3,758,186 | 9/1973 | Brumm | 359/12 |
| 4,720,158 | 1/1988 | Kuwayama et al. | 359/12 |
| 4,779,943 | 10/1988 | Tatsuno et al. | 350/3.7 |
| 4,789,977 | 12/1988 | Oudenhuysen et al. | 369/109 |
| 4,878,718 | 11/1989 | Gilbreath-Frandsen et al. | 359/12 |
| 4,947,402 | 8/1990 | Kane | 372/70 |
| 5,076,678 | 12/1991 | Gross et al. | 359/710 |

OTHER PUBLICATIONS

G. Hatakoshi and K. Goto, Appl. Opt. 24, 4307 (1985), "Gratine Lenses for the Semiconductor Laser Wavelength".

H. Chen, R. R. Hershey and E. Leith, Appl. Opt. 26, 1983 (1987), "Design of a Holographic Lens for the Infrared".

Y. Amitai, A. A. Friesem and V. Weiss, J. Opt. Soc. Am. A7, 80 (1990), "Designing Holographic Lenses with Different Recording and Readout Wavelengths".

H. P. Herzig, Opt. Comm. 58, 144 (1986), "Holographic Optical Elements (HOE) for Semiconductor Lasers".

F. Yamagishi, M. Kato, S. Maeda and T. Inagaki, Proc. Spie 1334, 182 (1990), "Correcting Chromatic Aberration in Holographic Optical Systems".

Y. Ono, Y. Kimura and S. Sugama, NEC Res. Develop. 89, 39 (1988), "Computer Generated Holographic Optical Elements for Optical Disk Memory Read Write Heads".

Y. Amitai and J. W. Goodman, Appl. Opt. 30, 2376 (1991), "Design of Substrate—Mode Holographic Interconnects with Different Recording and Readout Wavelengths".

*Primary Examiner*—Michael A. Papalas
*Attorney, Agent, or Firm*—Claude A. S. Hamrick

[57] ABSTRACT

The holographic element of the present invention includes a holographic grating pattern that is impressed in the media of the element utilizing beams of electromagnetic energy of wavelength $\lambda_o$. The holographic grating pattern is capable of manipulating a beam of electromagnetic energy having a wavelength $\lambda_c$ at which the media is not necessarily suitable for recording. The method for manufacturing the holographic element utilizes an object beam and a reference beam having aspherical wavefronts of wavelength $\lambda_o$ to create the grating pattern in the media. In the preferred embodiment, the aspherical object beam and reference beam are created utilizing parent holographic devices recorded with spherical beams. An alternative embodiment of the present invention is a doublet holographic device which incorporates two holographic elements that are formed in accordance with the present invention to manipulate a beam of electromagnetic energy of wavelength $\lambda_c$ in a desired manner. The invention is particularly useful in obtaining high-quality volume phase holograms for use outside of the blue-green spectral range. A particular application is manipulating beams of electromagnetic energy from infrared laser diodes.

20 Claims, 11 Drawing Sheets

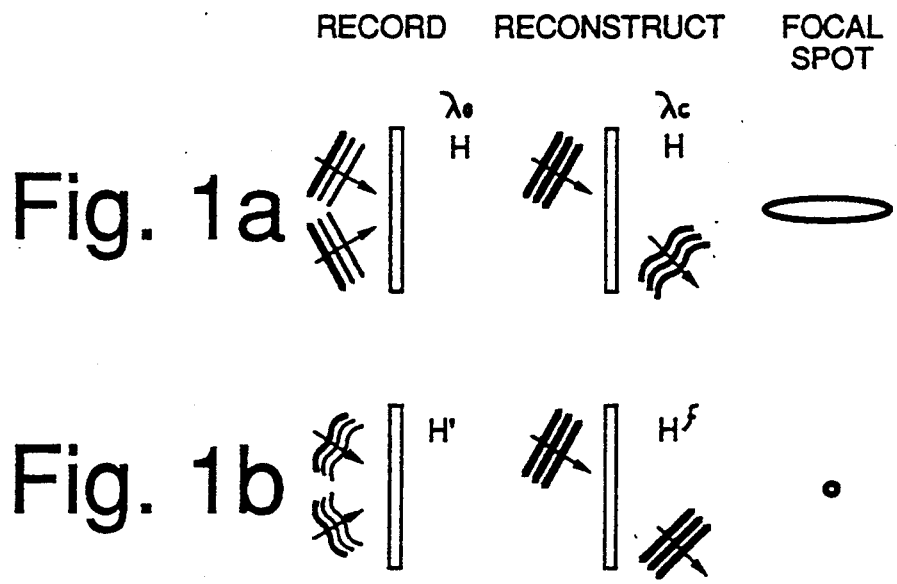
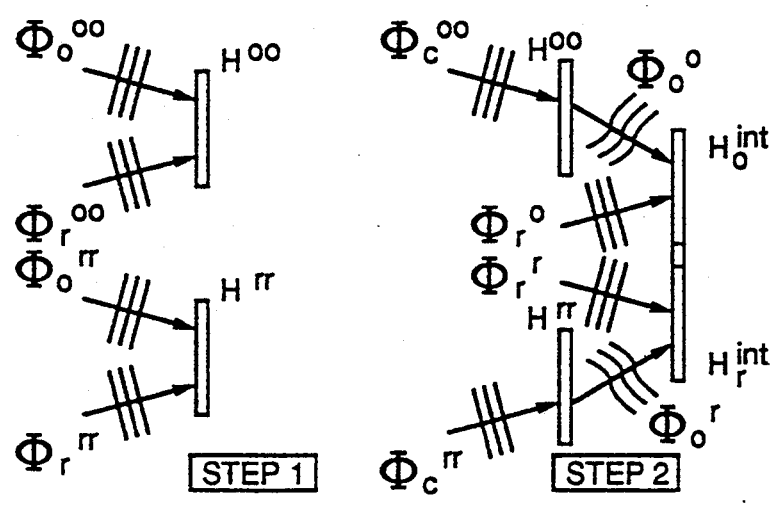
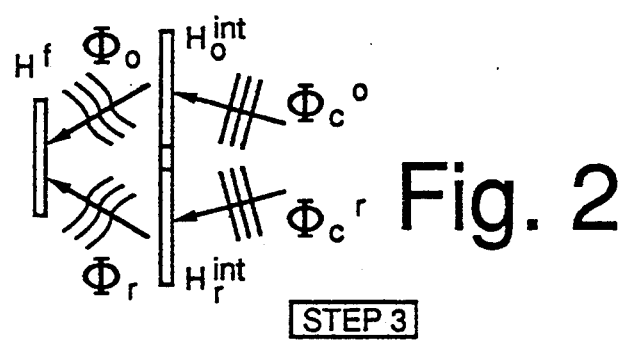
Fig. 2

SINGLE AND MULTIPLE ELEMENT HOLOGRAPHIC DEVICES FOR HIGH-EFFICIENCY BEAM CORRECTION

BACKGROUND OF THE INVENTION

1. Field of the Invention

The present invention relates generally to holographic devices and methods for the fabrication thereof, and more particularly to holographic devices including single or multiple holographic elements, where the holographic elements are fabricated utilizing electromagnetic energy having a wavelength at which the media comprising the holographic elements is suitable for impressing a holographic grating pattern, wherein the holographic grating pattern that is thereby created is utilized to diffract a beam of electromagnetic energy having a wavelength at which the media is not necessarily suitable for recording, in a desired manner.

2. Brief Description of the Prior Art

Laser diodes offer significant advantages over other laser sources in efficiency, size and cost, but suffer inferior optical characteristics. Their beams diverge, have an asymmetric cross-section, and are often astigmatic. These deficiencies must be corrected to comply with many of the current applications of laser diodes in communication, data storage and imaging. Since refractive optics corrective systems are bulky and expensive, other approaches have been utilized, including: integrated optics lenses or gratings, waveguide optics and holographic elements. Computer generated gratings have good optical performance but suffer relatively low efficiencies and require sophisticated manufacturing equipment. Although the holographic approach offers small dimensions and a range of beam correcting capabilities, it is difficult to implement. High quality photographic recording media are not available for laser diode wavelengths, and recording with shorter wavelengths introduces severe aberrations. Schemes for alleviating such recording-to-readout wavelength shift aberrations, have been limited to spherical light sources, without any correction for deficiencies in the input beam, as described in G. Hatakoshi and K. Goto, Appl. Opt. 24, 4307 (1985); H. Chen, R. R. Hershey, and E. Leith, Appl. Opt. 26, 1983 (1987); and Y. Amitai, A. A. Friesem, and V. Weiss, J. Opt. Soc. Am. A 7, 80 (1990). Another method is limited in practice to large f-numbers, as described in H. P. Herzig, Opt. Comm. 58, 144 (1986). Furthermore, as diffractive devices, these elements suffer strong chromatic effects. This is a major drawback in laser-diode applications since the output frequency of these devices can vary significantly with operating conditions as well as aging. To compensate for the chromatic properties, multiple element systems, employing two or three diffractive elements, or a hologram-refractive element combination have been proposed, as taught in F. Yamagishi, M. Kato, S. Maeda, and T. Inagaki. Proc. SPIE 1334, 182 (1990); and Y. Ono, Y. Kimura, and S. Sugama, NEC Res. Develop. 89, 39 (1988). A method for recording high-efficiency, low-aberration collimators for spherical light sources with large recording-to-readout wavelength shifts was described by Y. Amitai and J. W. Goodman in Appl. Opt. 30, 2376 (1991).

SUMMARY OF THE INVENTION

It is an object of the present invention to provide a holographic element that is impressed with a grating pattern created by aspherical wavefronts at wavelength $\lambda_o$, that is suitable for manipulating electromagnetic energy having a wavelength $\lambda_c$, where the holographic media of the holographic element is not necessarily suitable for recording at wavelength $\lambda_c$.

It is another object of the present invention to provide a method for manufacturing a holographic element utilizing aspherical wavefront beams of electromagnetic energy having a wavelength $\lambda_o$, that is capable of manipulating electromagnetic energy having a wavelength $\lambda_c$ in a desired manner.

It is a further object of the present invention to provide a holographic element for manipulating a beam of electromagnetic energy from a light source such as a laser diode having a wavelength $\lambda_c$ where the holographic media of the holographic element is not necessarily suitable for recording with electromagnetic energy having a wavelength $\lambda_c$.

It is yet another object of the present invention to provide a holographic device comprising two or more holographic elements each of which elements is impressed with a grating pattern created by aspherical wavefronts at wavelength $\lambda_o$, where said holographic device is capable of manipulating a beam of electromagnetic energy from a light source such as a laser diode.

It is yet a further object of the present invention to provide a high-efficiency beam-correcting collimator for light sources such as laser diodes.

It is still another object of the present invention to provide a high-efficiency beam-correcting device having an extended focal depth of field for monochromatic sources such as single mode laser diodes.

It is even yet another object of the present invention to provide a high-efficiency holographic doublet for focusing and forming an extended focal depth chromatic correction for polychromatic sources such as multimode laser diodes.

It is even yet a further object of the present invention to provide a holographic device and method which permits the utilization of high quality holographic media outside of the wavelength band in which it is suitable for recording.

The holographic element of the present invention includes an electromagnetic energy sensitive media onto which a holographic grating pattern is impressed utilizing a suitable interference pattern of beams of electromagnetic energy of wavelength $\lambda_o$. The holographic grating pattern is capable of manipulating a beam of electromagnetic energy having a wavelength $\lambda_c$ at which the media is not necessarily suitable for recording. The method for manufacturing the holographic element utilizes an object beam and a reference beam having aspherical wavefronts of wavelength $\lambda_o$ to create the grating pattern in the media. In the preferred embodiment, the aspherical object beam and reference beam are created utilizing holographic devices. Alternative embodiments of the present invention are holographic devices which incorporate two or more holographic elements that are formed in accordance with the present invention to manipulate a beam of electromagnetic energy of wavelength $\lambda_c$ in a desired manner. The multiple holographic element device may be formed on a single substrate or in a single medium. The invention is particularly useful in manipulating a beam of electromagnetic energy from a source such as a laser diode where the media that comprises the holographic element is not necessarily suitable for recording by electromagnetic energy at the wavelength of said source.

It is an advantage of the present invention that it provides a holographic element that is impressed with a grating pattern created by aspherical wavefronts at wavelength $\lambda_o$, that is suitable for manipulating electromagnetic energy having a wavelength $\lambda_c$, where the holographic media of the holographic element is not necessarily suitable for recording at wavelength $\lambda_c$.

It is another advantage of the present invention that it provides a method for manufacturing a holographic element utilizing aspherical wavefront beams of electromagnetic energy having a wavelength $\lambda_o$, that is capable of manipulating electromagnetic energy having a wavelength $\lambda_c$ in a desired manner.

It is a further advantage of the present invention that it provides a holographic element for manipulating a beam of electromagnetic energy from a light source such as a laser diode having a wavelength $\lambda_c$ where the holographic media of the holographic element is not necessarily suitable for recording with electromagnetic energy having a wavelength $\lambda_c$.

It is yet another advantage of the present invention that it provides a holographic device comprising two or more holographic elements each of which elements is impressed with an interference pattern created by aspherical wavefronts at wavelength $\lambda_o$, where said holographic device is capable of manipulating a beam of electromagnetic energy from a light source such as a laser diode.

It is yet a further advantage of the present invention that it provides a high-efficiency beam-correcting collimator for light sources such as laser diodes.

It is still another advantage of the present invention that it provides a high-efficiency beam-correcting device having an extended focal depth of field for monochromatic sources such as single-mode laser diodes.

It is even yet another advantage of the present invention that it provides a high-efficiency holographic doublet for focusing and forming an extended focal depth chromatic correction for polychromatic sources such as multimode laser diodes.

It is even yet a further advantage of the present invention that it provides a holographic device and method which permits the utilization of high quality holographic media outside of the wavelength band in which it is suitable for recording.

These and other objects, features and advantages of the present invention will be apparent from the following detailed description of the preferred embodiments which make reference to the several figures of the drawing.

IN THE DRAWING

FIGS. 1a and 1b schematic diagrams of the general concept embodied in the present invention, wherein FIG. 1a depicts the general problem of formulating a holographic element with electromagnetic energy of a first wavelength $\lambda_o$ and thereafter utilizing the holographic element to manipulate electromagnetic energy of wavelength $\lambda_c$; and wherein FIG. 1b depicts the generalized solution of forming the holographic element utilizing aspherical wavefront beams at wavelength $\lambda_o$ to create a holographic element which manipulates an electromagnetic energy having wavelength $\lambda_c$ in a desired manner;

FIG. 2 is a schematic diagram presenting a three step process of the preferred embodiment for fabricating a holographic element $H^f$ utilizing an object beam and a reference beam each having an aspherical wavefront at wavelength $\lambda_o$, where the object beam and reference beam are themselves created from holographic elements;

Figure 4A:
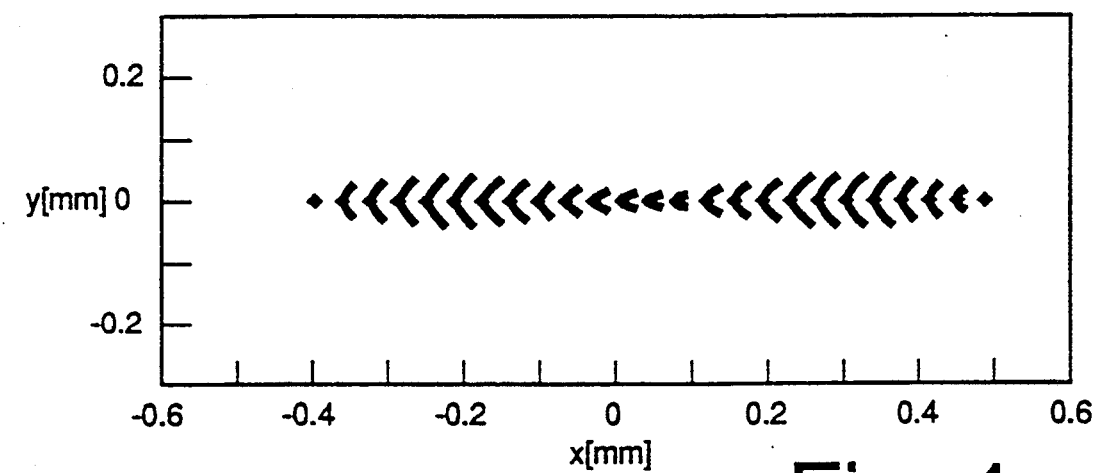
Figure 4B:
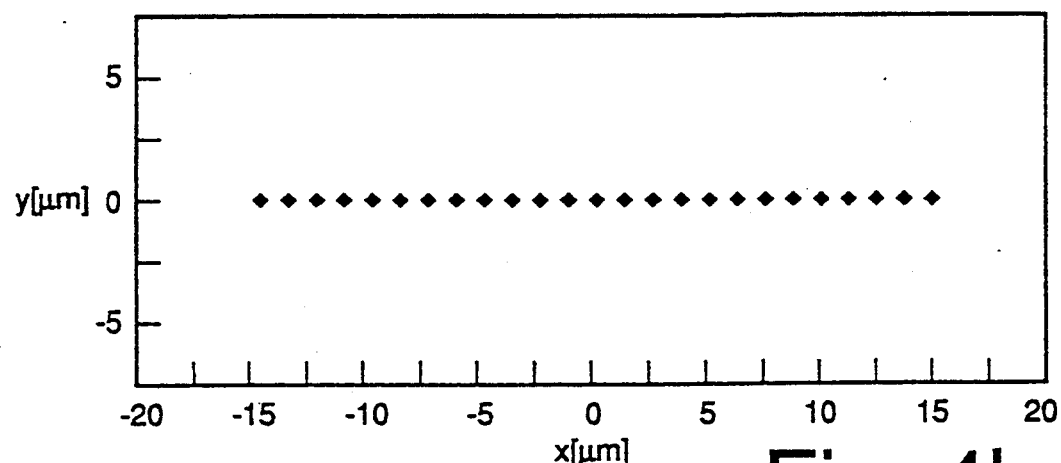
Figure 4C:
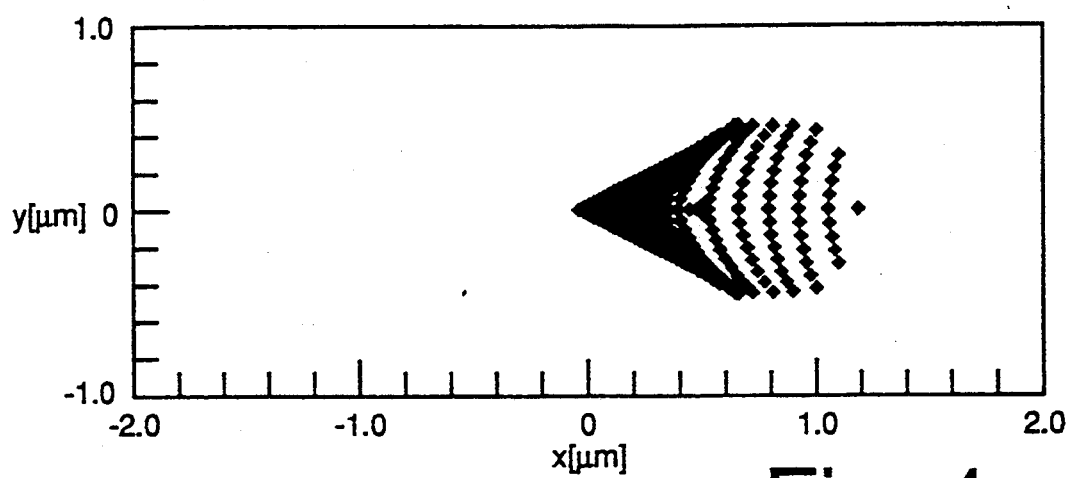
Figure 5:
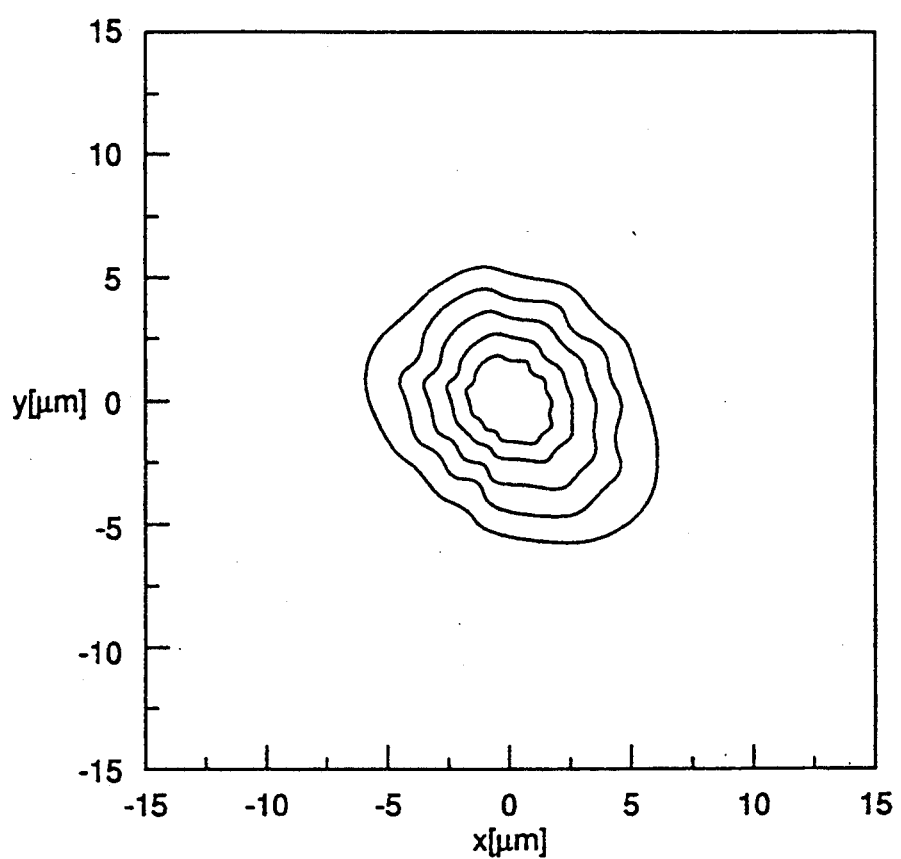
Figure 6:
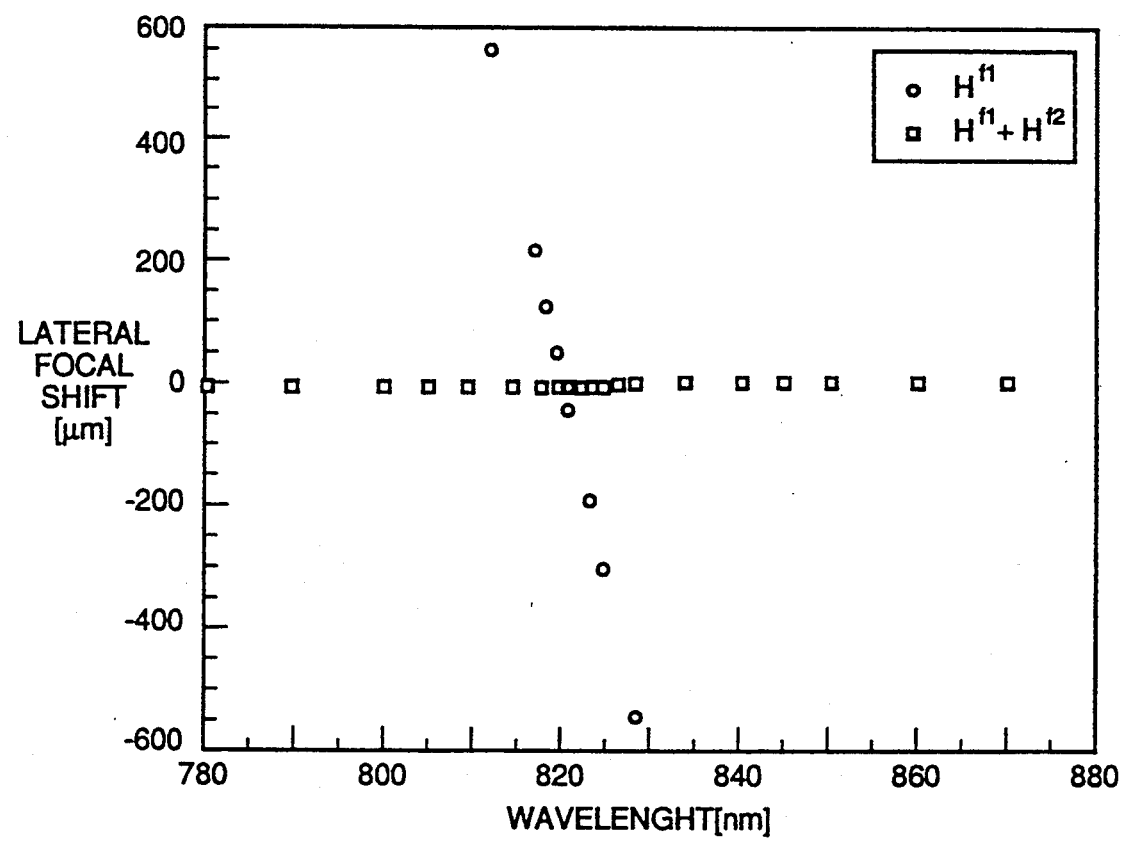
Figure 7:
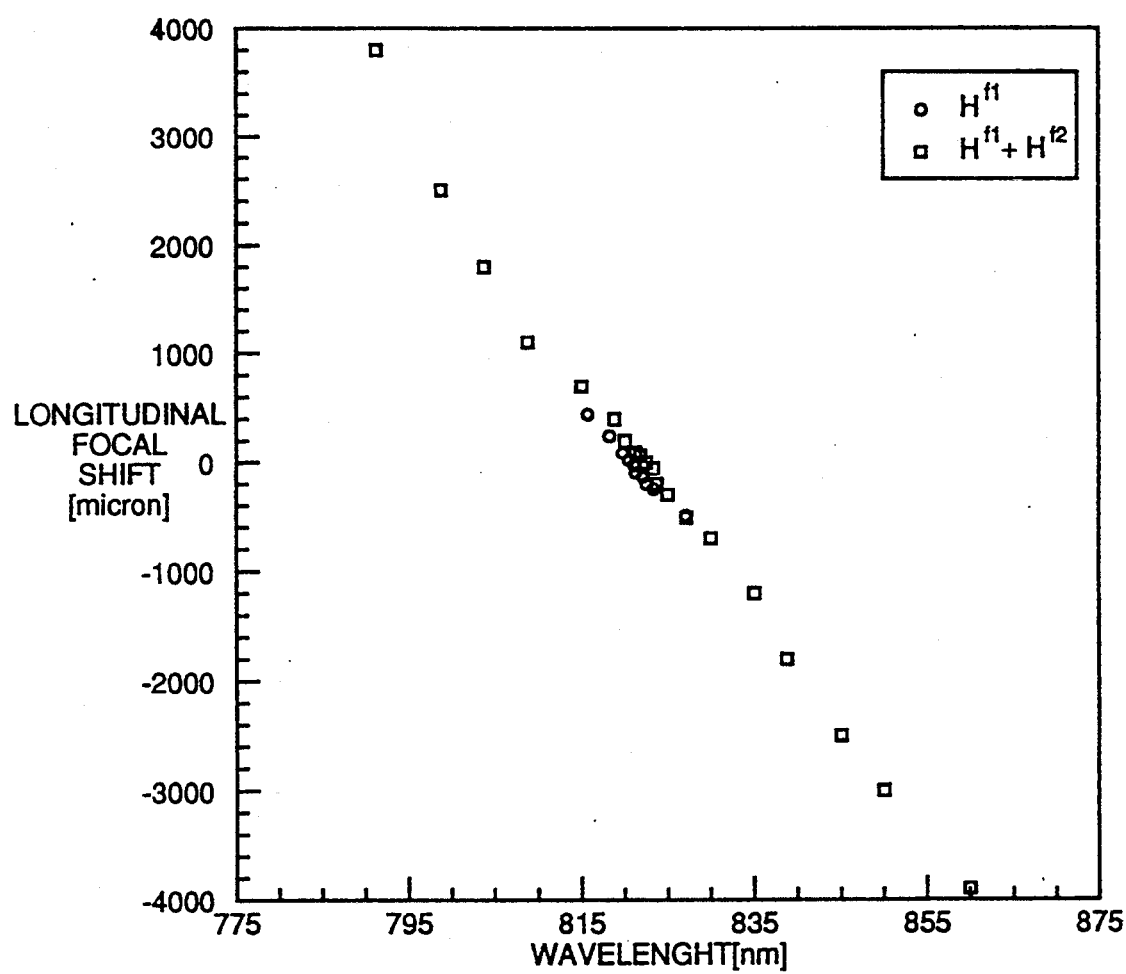
Figure 8A:
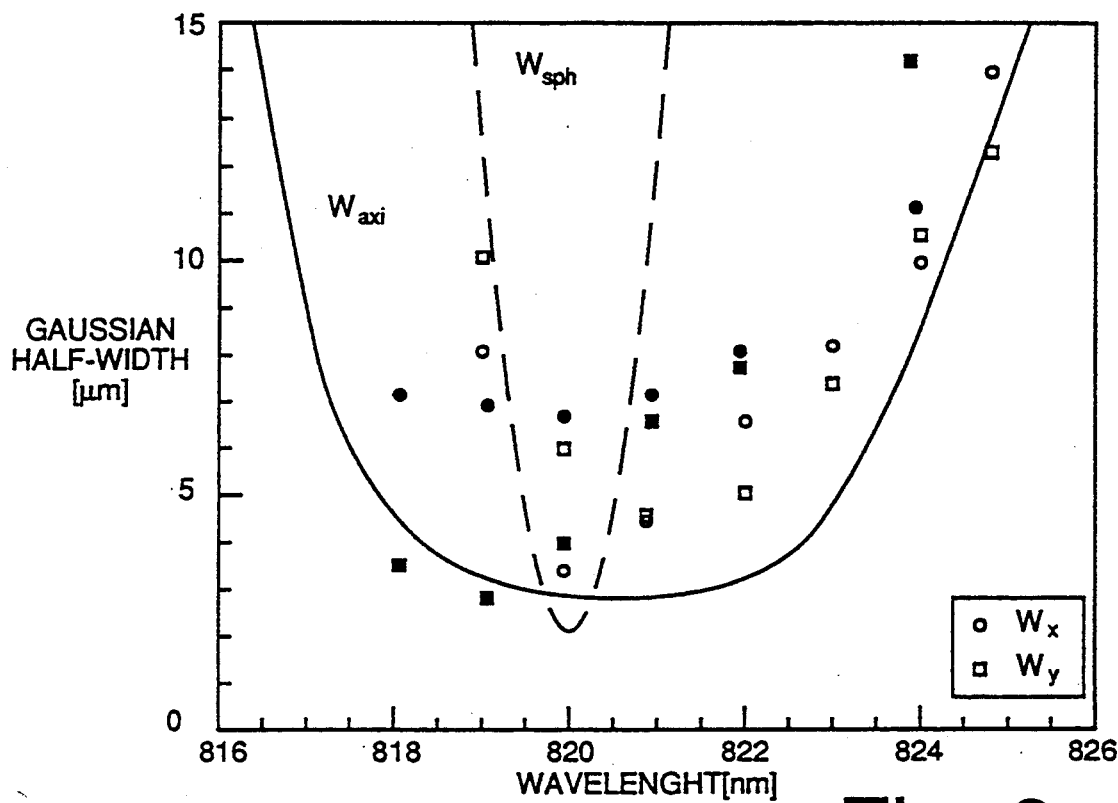
Figure 8B:
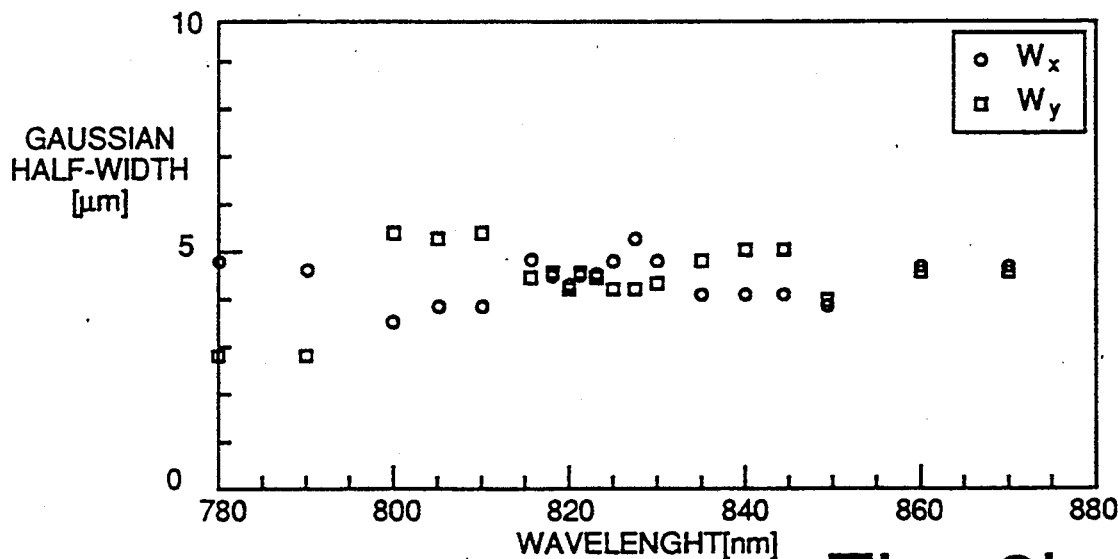
Figure 9A:
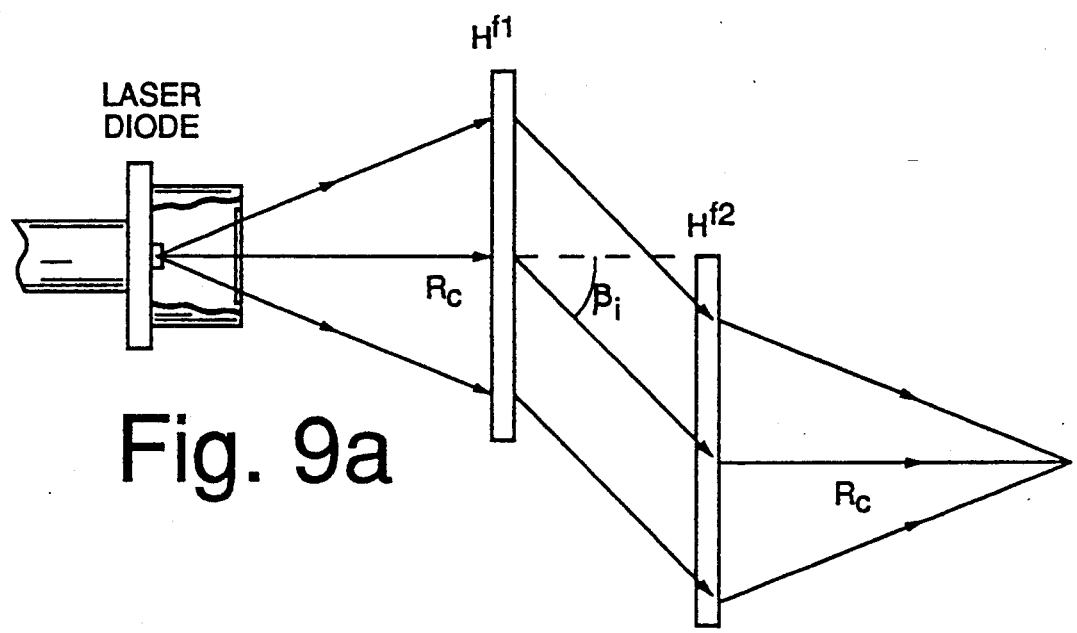
Figure 9B:
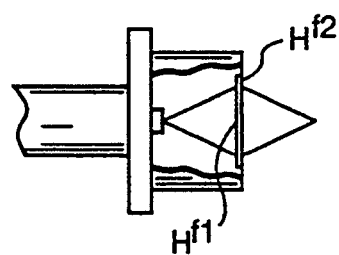
Figure 10A:
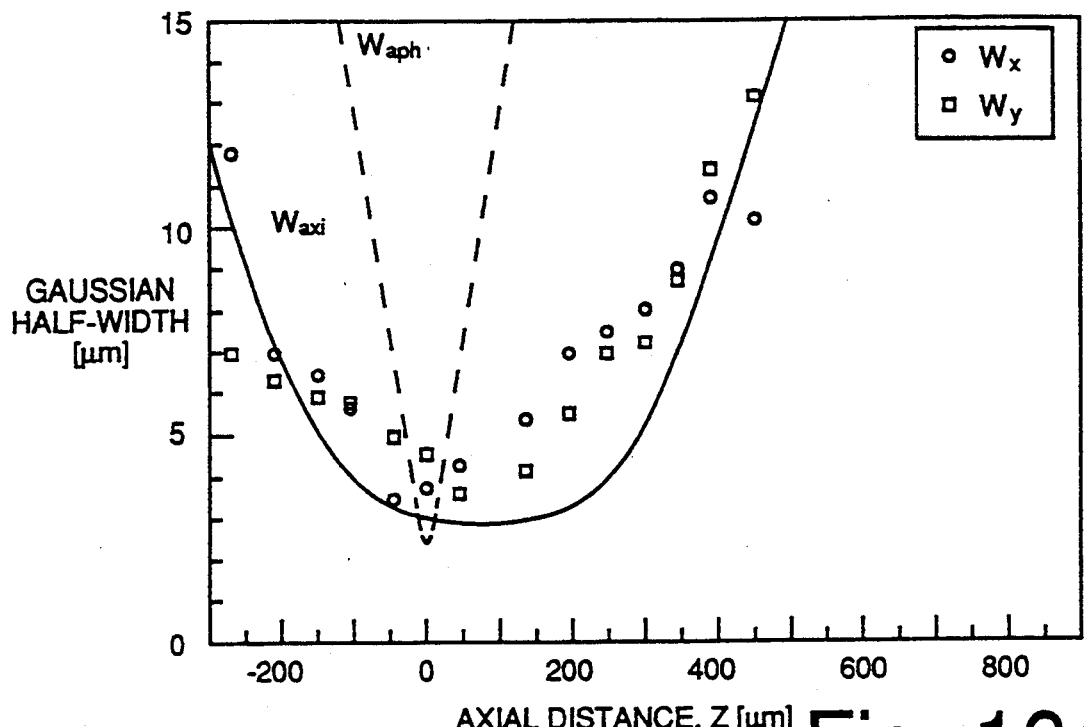
Figure 10B:
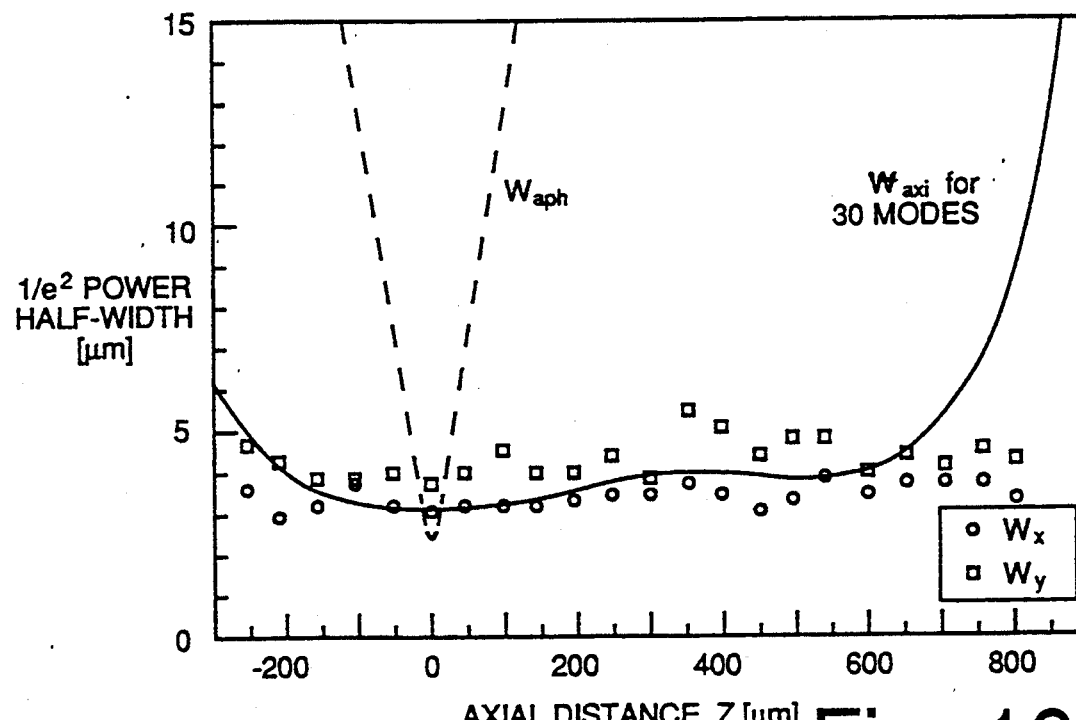
Figure 11:
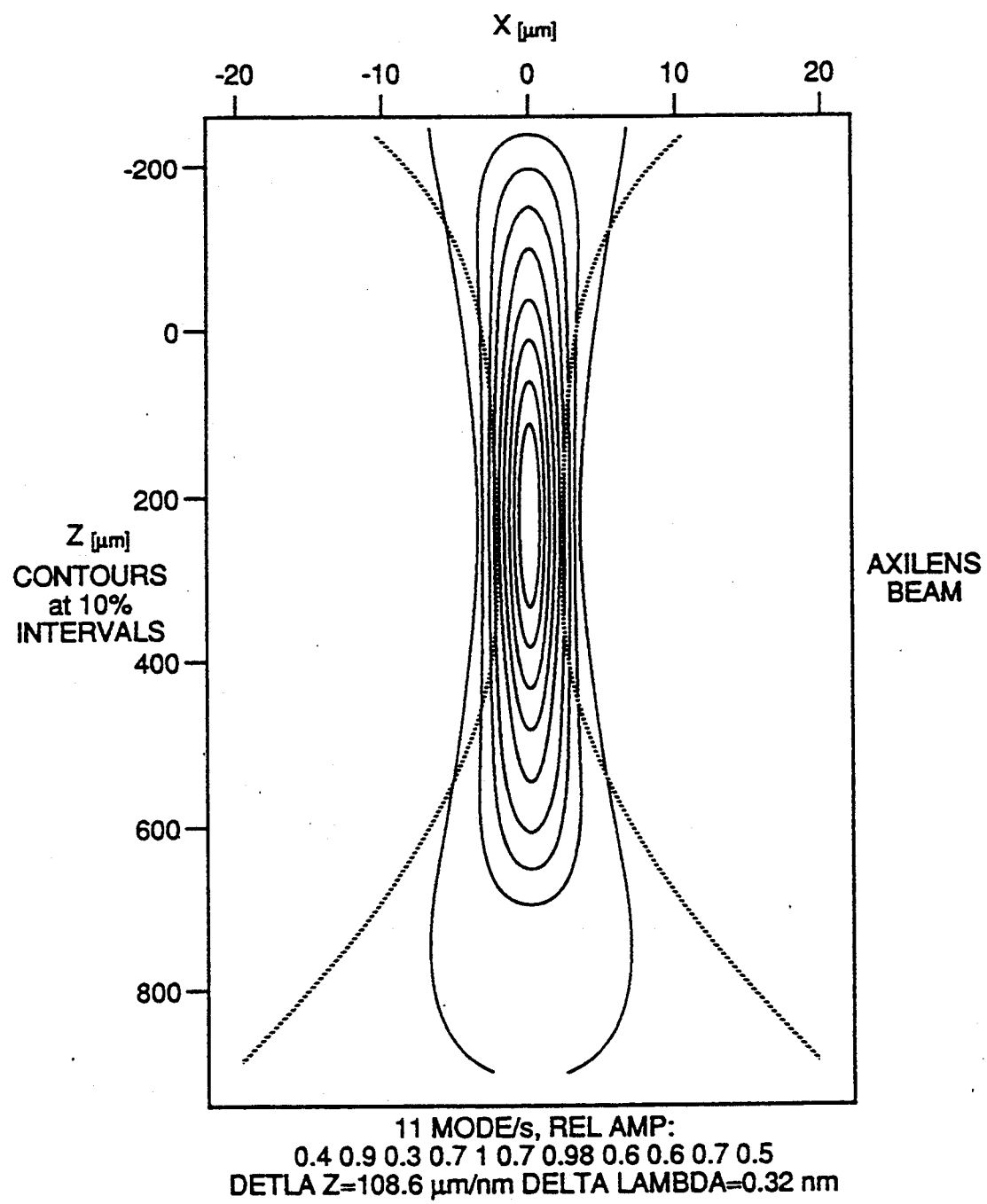
Figure 12:
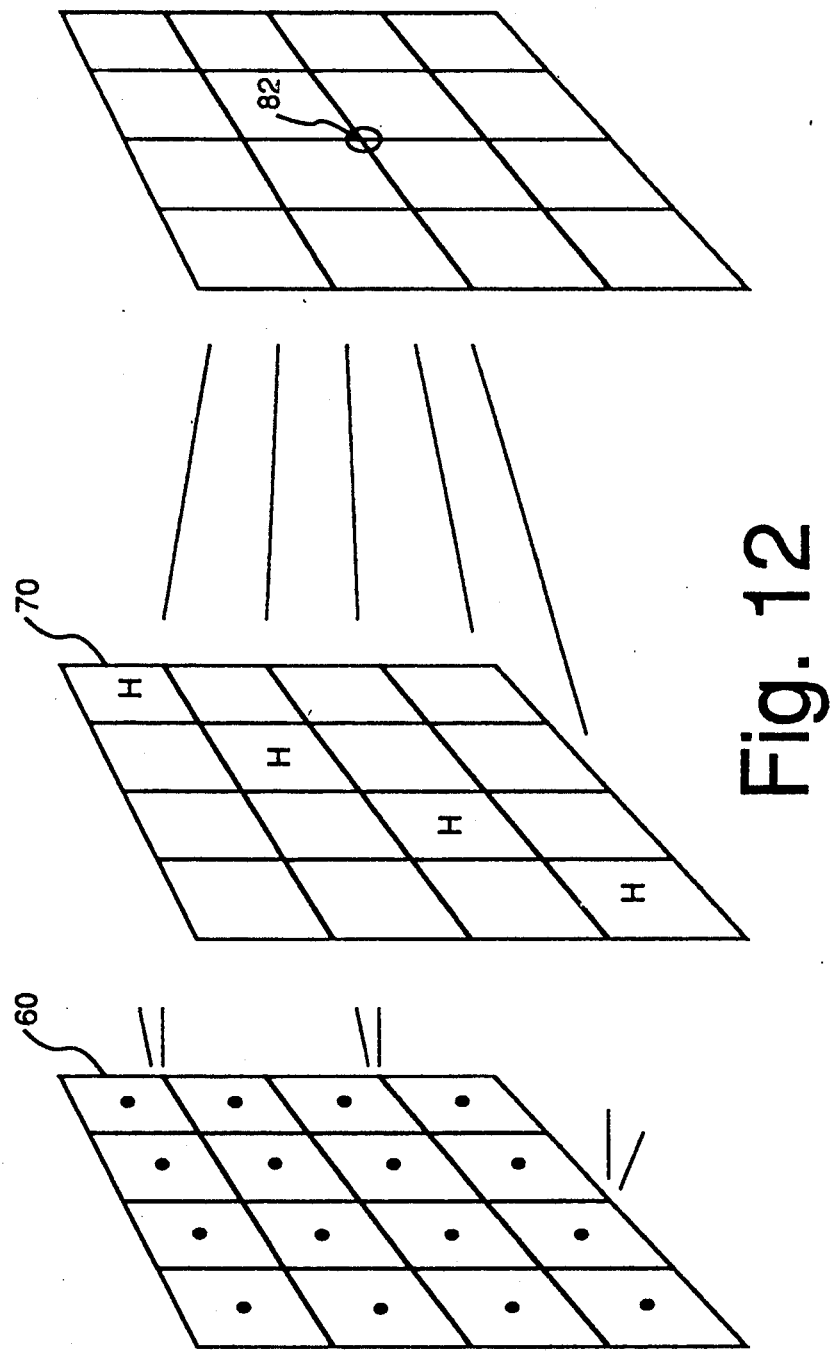

FIGS. 4a and 4b are graphical comparisons of ray trace foci for a source with 25 $\mu$m astigmatism, as collimated by a holographic element, and focused by a well-corrected lens; wherein FIG. 4a depicts an uncorrected, high-efficiency collimator recorded to comply with Eqs.(1); FIG. 4b depicts a collimator without built-in astigmatism; and FIG. 4c depicts the optimized holographic collimator; note the different scales of the three plots;

FIG. 5 depicts an experimental laser diode beam focal spot, as collimated by a holographic element of the present invention and focused by a well-corrected lens;

FIG. 6 presents a graphical depiction of lateral focal position as a function of wavelength, circles are for $H^{f1}$, squares are for $H^{f1}+H^{f2}$;

FIG. 7 presents a graphical depiction of longitudinal focal position as a function of wavelength, circles are for $H^{f1}$, squares are for $H^{f1}+H^{f2}$;

FIGS. 8a and 8b present graphical depictions of experimental focal Gaussian half-width in the vertical (circles) and the horizontal (squares) axes as a function of $\lambda$ for $H^{f1}$ (filled symbols) and the holographic doublet $H^{f1}+H^{f2}$ (empty symbols); wherein FIG. 8a presents experimental points for no refocusing as compared to Fraunhofer diffraction widths for a perfect spherical holographic element ($W_{sph}$, dashed line) and an axilens holographic element with $\delta\lambda=5$ nm ($W_{axi}$, solid line); FIG. 8b presents experimental points obtained with refocusing at each wavelength; note the different wavelength scales in (a) and (b);

FIGS. 9a and 9b depict schematic layouts of the holographic focusing doublet of the present invention; wherein FIG. 9a depicts the schematic layout of the doublet $H^{f1}+H^{f2}$, and FIG. 9b depicts the doublet disposed upon the window of a laser diode to focus the beam from the diode;

FIGS. 10a and 10b present graphical depictions of experimental focal Gaussian half-width in the vertical (circles) and the horizontal (squares) axes as a function of axial distance for the holographic doublet; wherein FIG. 10a presents experimental points for a single-frequency beam (820 nm) and Fraunhofer diffraction width for a spherical holographic element ($W_{sph}$, dashed line) and an axilens with $\delta\lambda=5$ nm ($W_{axi}$, solid line); FIG. 10b presents experimental points for a multimode laser diode beam and a simulation curve described in this application;

FIG. 11 presents a graphical depiction of the focal point spacial distribution for a multimode laser diode having 11 modes, utilizing a holographic doublet of the present invention; and FIG. 12 depicts a single source or multiple array of sources the output of which is manipulated by an array of holographic elements of the present invention, to illuminate a single or array of output devices.

DETAILED DESCRIPTION OF THE PREFERRED EMBODIMENTS

In this application, the process of impressing a grating pattern in a holographic medium will be referred to as recording, and the process of manipulating the electromagnetic energy of a source in a desired manner is referred to as readout or reconstruction.

The following conditions are utilized for recording a high-efficiency hologram with two spherical waves in the presence of recording-to-readout wavelength shift:

$$\frac{1}{R_o} = a\frac{1}{R_i} + b\frac{1}{R_c}, \quad (1)$$

$$\frac{1}{R_r} = a\frac{1}{R_c} + b\frac{1}{R_i},$$

$$\sin \beta_o = a \sin \beta_i + b \sin \beta_c,$$
$$\sin \beta_r = a \sin \beta_c + b \sin \beta_i,$$

where the subscripts c,o,r and i represent the reconstruction, object, reference and image waves, respectively; $R_q$ (q=c,o,r,i) are the distances of the respective sources to the center of the hologram; $\beta_q$ (q=c,o,r,i) are the respective off-axis angles;

$$\text{where } a \equiv \frac{\mu + 1}{2\mu}, \quad b \equiv \frac{\mu - 1}{2\mu}$$

and $\mu$ is the readout-to-recording wavelength ratio:

$$\mu \equiv \frac{\lambda_c}{\lambda_o}.$$

With regard to aberrations related to recording and reconstruction wavelength differences, as depicted in FIG. 1a, a hologram recorded at $\lambda_o$ to comply with Eq.(1) will have a highly aberrated output at $\lambda_c$. However, as depicted in FIG. 1b, if a hologram H$^f$ is recorded with appropriately distorted (aspherical) recording wavefronts at $\lambda_o$, then the output can achieve diffraction limited performance at $\lambda_c$. The recording of such a hologram H$^f$ is achieved in the present invention, as depicted in FIG. 2.

As set forth in FIG. 2, initially, two independent holograms, H$^{\infty}$ and H$^{rr}$, are recorded utilizing object beams and reference beams having spherical wavefronts. For ease of comprehension, the superscript designations represent the position of the element in the process tree and the subscript designation relates to the final purpose of an element, wherein "o" represents an object beam related element and "r" refers to a reference beam related element and "c" relates to a reconstruction beam related element. As depicted in step 1 of FIG. 2, an initial holographic element H$^{\infty}$ is generated from an object beam having a spherical wavefront $\Phi_o^{\infty}$ and a reference beam having a spherical wavefront $\Phi_r^{\infty}$, it being understood that holographic element H$^{\infty}$ relates to the parent object wave that will be utilized to create the final hologram H$^f$ (beams shall hereinafter be identified by their phase front $\Phi$). Likewise, the initial hologram H$^{rr}$ related eventually to the parent reference beam that will be utilized to create the final hologram H$^f$ is created from an object beam $\Phi_o^{rr}$ and a reference beam $\Phi_r^{\infty}$ that each have spherical wavefronts.

In step 2 of FIG. 2, holographic object beam element H$^{\infty}$ is illuminated by a reconstruction beam $\Phi_c^{\infty}$ having a wavelength $\lambda_o$. Reconstruction beam $\Phi_c^{\infty}$ has a different radius of curvature and angle of incidence $\beta_c^{\infty}$ than either the object beam $\Phi_o^{\infty}$ or reference beam $\Phi_r^{\infty}$ and therefore creates an output wavefront $\Phi_o^o$ having a distorted (aspherical) wavefront at wavelength $\lambda_o$. In like manner, holographic element H$^{rr}$ is illuminated by reconstruction beam $\Phi_c^{rr}$ having a spherical wavefront at wavelength $\lambda_o$. The radius of curvature and angle of incidence of reconstruction beam $\Phi_c^{rr}$ differ from those of either the object beam $\Phi_o^{rr}$, or the reference beam $\Phi_r^{rr}$, such that the output beam $\Phi_o^r$ from hologram H$^{rr}$ possesses an aspherical wavefront at wavelength $\lambda_o$.

It is considered to be feasible that the final holographic element H$^f$ could be created by illumination of a holographic media with the aberrated beams $\Phi_o^o$ and $\Phi_o^r$. However, the alignment of the two beams, and therefore the two holograms H$^{\infty}$ and H$^{rr}$ is a difficult matter. To solve the alignment difficulty, two interim holograms H$_o^{int}$ and H$_r^{int}$ are multiplexed in a single medium. Specifically, holographic element H$_o^{int}$ is created from aspherical object beam $\Phi_o^o$ and a spherical reference beam $\Phi_r^o$ having a wavelength $\lambda_o$. In like manner, interim holographic element H$_r^{int}$ is formed from the aspherical wave $\Phi_o^r$ and a reference beam $\Phi_r^r$ having a spherical wavefront at wavelength $\lambda_o$. The two interim holograms are therefore disposed in fixed position (such as on a planar surface depicted in FIG. 2) to facilitate the alignment of the further object and reference beams that are utilized to form the final hologram H$^f$ in step 3 of FIG. 2.

As depicted in step 3 of FIG. 2, a reconstruction beam $\Phi_c^o$ having a spherical wavefront at wavelength $\lambda_o$ illuminates the interim hologram H$_o^{int}$ to produce object beam $\Phi_o$ having an aspherical wavefront at wavelength $\lambda_o$. In like manner, reconstruction beam $\Phi_c^r$ illuminates interim hologram H$_r^{int}$ to create reference beam $\Phi_r$ having an aspherical wavefront at wavelength $\lambda_o$. The aspherical object beam $\Phi_o$ and the aspherical reference beam $\Phi_r$ then create an interference pattern which results in the formation of a grating pattern in the holographic media of the final hologram H$^f$.

A significant difference between the present invention and the prior art is the utilization of spherical wavefronts in the parent reference beams that form the parent holograms of the present invention, whereas the prior art teaches the utilization of plane waves for the parent reference beams that form parent holograms. The utilization of spherical wavefronts permits the variation of parameters, such as radius of curvature and angle of incidence, whereby the introduction of calculated and controlled aberrations into the final holographic element H$^f$ is facilitated to achieve various purposes.

A hologram H$^f$ and the method of formation thereof, as described above, has particular application where it is desired to create a hologram (such as H$^f$) that is designed to manipulate a beam of electromagnetic energy at wavelength $\lambda_c$ where the material that comprises the holographic media of H$^f$ is not suitable for recording at wavelength $\lambda_c$. In this situation, with the appropriate selection of various beam parameters (as described hereinbelow), beams of electromagnetic energy at wavelength $\lambda_o$ (a wavelength at which the holographic media of H$^f$ is suitable for recording), such as object beam $\Phi_o$ and reference beam $\Phi_r$, having aspherical wavefronts can be utilized to create a hologram H$^f$ that effectively manipulates a beam of electromagnetic energy having wavelength $\lambda_c$ in a desired manner.

The teachings of the present invention enable the formation of volume phase holographic elements, which are suitable for high efficiency performance outside of the normal recording bandwidth of the holographic media. Such volume phase holographic elements have a thickness of several wavelengths and a grating that primarily affects the phase of the electromagnetic radiation. These holographic elements therefore diffract in the Bragg regime, which can insure a very high diffraction efficiency into the desired diffraction order. Currently, high-quality volume holographic media is limited to wavelengths in the blue-green spectrum. While the responsivity of some of these media can be extended to the entire visible wavelength spectrum, typically large background noise occurs at the red wavelengths. The present invention utilizes electromagnetic energy having a wavelength in the blue-green spectral range to create an efficient, high-quality holographic element that is suitable for the controlled diffraction of electromagnetic energy having a wavelength outside this blue-green spectral range. A particular application of the holographic element H$^f$ is in the manipulation of infrared (wavelength $\lambda_c$) electromagnetic energy from a laser diode in a desired manner, where holographic media that are suitable for recording at the wavelength of the laser diode beam are not available.

Figure 3:
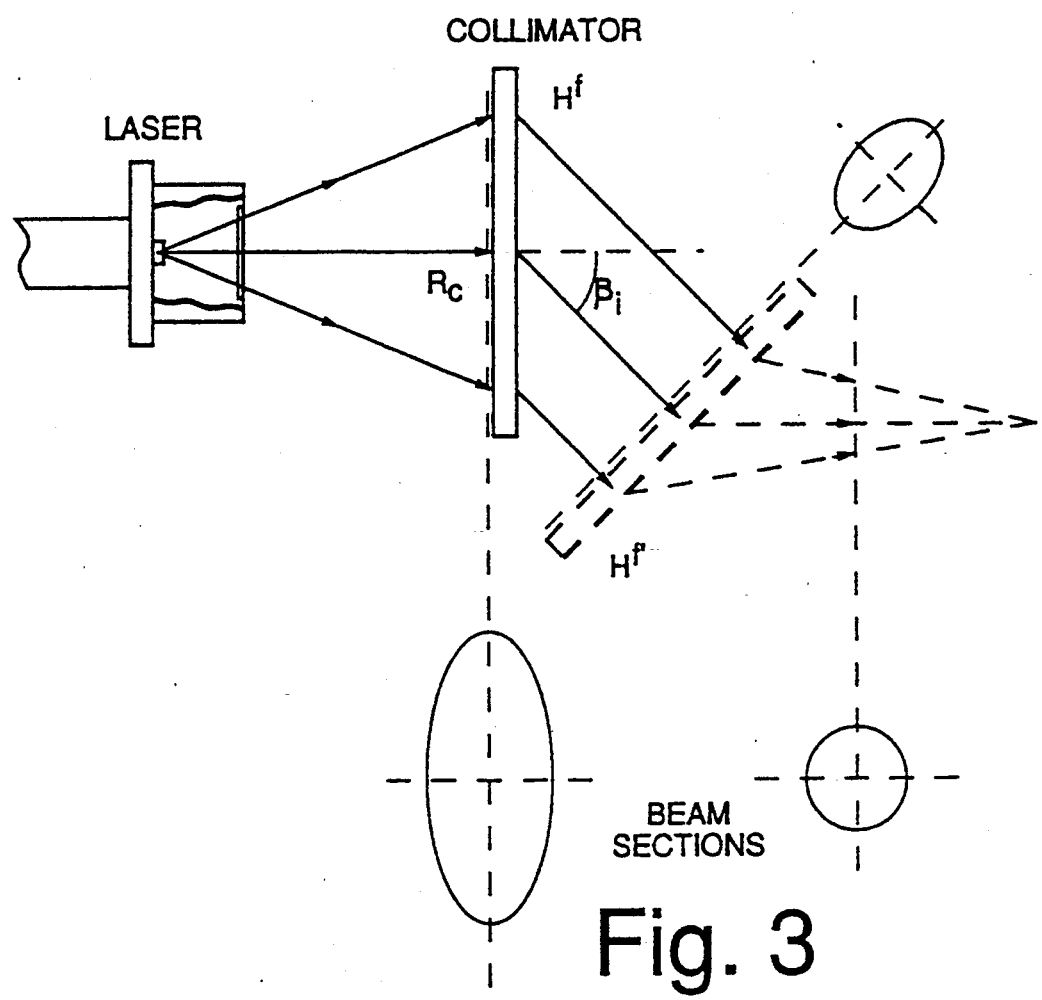
FIG. 3 is a schematic depiction of the laser diode beam collimation geometry of the present invention, wherein the holographic collimator of the present invention (solid lines) corrects for the astigmatism and a portion of the beam ellipticity; an additional element (dashed lines), can optionally be added to focus the beam, and remove the residual ellipticity.

In order to create a suitable grating pattern within holographic element H$^f$ for controlling electromagnetic radiation at wavelength $\lambda_c$, it is necessary to properly select the various parameters (principally radii of curvature R and angles of incidence $\beta$) of the various beams of electromagnetic energy depicted in FIG. 2 having wavelength $\lambda_o$. It has been found that since beam correcting requirements of the element are typically much smaller than the aberrations introduced by wavelength shift, the object and reconstruction waves for H$^{oo}$ and H$^{rr}$ can be restricted to normal incidence (that is $\beta_o^{oo}=\beta_c^{oo}=\beta_o^{rr}=\beta_c^{rr}=0$ where the superscripts o and r mark the parameters associated with H$^{oo}$ and H$^{rr}$, respectively). Additionally, in the preferred embodiment, $\Phi_r^o=\Phi_r$ and $\Phi_c^r=\Phi_c^o=\Phi_r^{o*}=\Phi_r^*$, where the * signifies the conjugate wavefront. This simplifies operational application of H$^f$ and reduces both coma and high-order astigmatism. FIG. 3 depicts an on-axis holographic element H$^f$ at a distance R$_c$ from the source, for collimating light at an off-axis angle $\beta_i$. Therefore, $\beta_c=0$ and R$_i=\infty$.

Combining the above conditions, the relations between the recording and reconstructing wavefronts in H$^{oo}$ and H$^{rr}$, and the constraints for high efficiency [Eq.(1)], we find that, $$\frac{1}{R_o} = \frac{1}{R_o^{oo}} + \frac{1}{R_c^{oo}} - \frac{1}{R_r^{oo}} = \frac{b}{R_c}, \quad (2)$$

$$\frac{1}{R_r} = \frac{1}{R_o^{rr}} + \frac{1}{R_c^{rr}} - \frac{1}{R_r^{rr}} = \frac{a}{R_c},$$

$$\sin \beta_o = -\sin \beta_r^{oo} = a \sin \beta_i,$$

$$\sin \beta_r = -\sin \beta_r^{rr} = b \sin \beta_i.$$

The overall aberrations of H$^f$ can then be expressed in Equation 3-6.

$$S_3 = \frac{1}{R_c^3} + \mu \left[ \frac{1}{(R_o^{oo})^3} + \frac{1}{(R_c^{oo})^3} - \frac{1}{(R_r^{oo})^3} - \frac{1}{(R_o^{rr})^3} - \frac{1}{(R_c^{rr})^3} + \frac{1}{(R_r^{rr})^3} \right], \quad (3)$$

$$S_5 = \frac{1}{R_c^5} + \mu \left[ \frac{1}{(R_o^{oo})^5} + \frac{1}{(R_c^{oo})^5} - \frac{1}{(R_r^{oo})^5} - \frac{1}{(R_o^{rr})^5} - \frac{1}{(R_c^{rr})^5} + \frac{1}{(R_r^{rr})^5} \right], \quad (4)$$

$$C_3 = \mu \left[ \frac{\sin \beta_r^{oo}}{(R_r^{oo})^2} - \frac{\sin \beta_r^{rr}}{(R_r^{rr})^2} \right], \quad (5)$$

$$A = \mu \left[ \frac{\sin^2 \beta_r^{oo}}{R_r^{oo}} - \frac{\sin^2 \beta_r^{rr}}{R_r^{rr}} \right], \quad (6)$$

where S$_3$ and S$_5$ are the third and fifth order spherical aberrations, respectively, C$_3$ the third order coma, A the third order astigmatism. In order to achieve beam correcting capability in the holographic element H$^f$, appropriate values are set for the parameters S$_3$, S$_5$, C$_3$ and A. The first three Seidel aberrations, coma, spherical aberration and astigmatism, and combinations thereof, can be corrected by the selection of appropriate values for these parameters.

Example I.

Astigmatism Correcting Collimator

The present invention includes a method for recording a high efficiency, holographic beam-shaping collimator that is suitable for use with astigmatic sources in the presence of large recording-to-readout wavelength shifts. To produce such a device, the method described above is utilized to achieve the collimation of aspherical waves. Astigmatism and anamorphic beam shaping are also included in the design; the former as a deviation from the zero astigmatic aberration constraint, and the latter by selecting an appropriate diffraction angle. The method has been demonstrated, with a collimator recorded at 488 nm for a commercial diode laser operating at 820 nm; a high diffraction efficiency and near diffraction-limited performance was obtained.

In order to correct for astigmatism only, the parameters of equations 3-6 are $$S_3 = 0, \quad S_5 = 0, \quad C_3 = 0 \text{ and } A = \frac{-\Delta_A}{R_c^2}$$

where $\Delta_A$ is the paraxial longitudinal astigmatism of the source to be corrected. Higher order coma and astigmatism are negligible for small A. The eight equations [Eqs. (2)-(6)] can be solved for their eight unknowns when $\mu \geq 1$ and for practical A ($\Delta_A < 0.2$ mm for the geometry considered below).

A holographic element H$^f$ suitable to act as a collimator, was developed in accordance with the criteria set forth above for a commercial laser diode (Sony SLD 202 V) featuring the following characteristics:

$R_c = 40$ mm, $\beta_i = 50°$, $\Delta_A = 25$ μm, $\lambda_o = 488$ nm,
$\lambda_c = 820$ nm, \hfill (7)

for which Eqs. (2)–(6) yield:

$R_o{}^\infty = -69.1$ mm, $R_r{}^\infty = 11.48$ m, $\beta_r{}^\infty = -37.66°$,
$R_c{}^\infty = 51.0$ mm, $R_o{}^{rr} = -238.8$ mm; $R_r{}^{rr} = -8.262$
m, $\beta_r{}^{rr} = -8.92°$, $R_c{}^{rr} = 41.6$ mm, \hfill (8)

To simplify the recording setup of H$^f$, the output beam angle was chosen to compensate for half the beam's ellipticity (measured as 2.4). To eliminate the ellipticity completely, a larger diffraction angle can be used, or alternatively, a second holographic element H$^f$ can be added to focus the beam and correct for the residual beam ellipticity as depicted in FIG. 3.

The holographic collimator H$^f$ was evaluated by focusing its output beam with a well-corrected lens of 50 mm focal length. A ray tracing analysis predicts a focal spot smaller than 1 μm (FIG. 4c) for this system. In comparison, a 25 μm spot is predicted for a similar collimator without astigmatism correction (FIG. 4b) and a 2 mm spot for an uncorrected hologram recorded with spherical waves according to Eq. (1) (FIG. 4a). Coupled wave theory predicts a diffraction efficiency of 97%, assuming that the hologram thickness is 7 μm and its refraction index modulation is 0.04. FIG. 5 shows the experimental focal spot obtained for a single-mode laser diode beam; a phase hologram fabricated with the parameters of Eq. (8) collimates the beam, which is subsequently focused with a high-quality lens. The hologram has an effective aperture of 10 mm so the observed focal spot (12±1 μm) is comparable to the diffraction limit (10 μm). Beam astigmatism was smaller than the experimental resolution (2 μm), and the ellipticity of the beam was reduced to half its initial value. The present collimator H$^f$ had a 64% diffraction efficiency. As indicated by the theoretical analysis, the efficiency can be improved substantially with careful control of the emulsion thickness during the development process.

It is, therefore, to be understood that a method for generating a well-corrected holographic collimator for aberrated sources such as laser diodes has been developed. This technique was demonstrated with a high-efficiency, astigmatism correcting collimator for a commercial laser diode, which exhibits near diffraction-limited performance. Furthermore, ray tracing analysis predicts comparable performance for a more compact element ($R_c = 3.6$ mm, f/1.4), which can be mounted directly onto the laser diode's casing to replace the standard protective window.

Example II

Holographic Doublet for Extended Depth of Focus and Chromatic Correction

The variation in several focal point parameters as a function of wavelength for an otherwise well-corrected holographic element H$^{f1}$ (to be described below) demonstrate the problem of a single hologram with chromatic effects. For a 1 nm shift from the design wavelength (820 nm), the following changes are observed as shown in FIGS. 6 and 7: 120 μm in lateral position; 85 μm in longitudinal position and 0.6 μm in the astigmatism. In general, it would also be expected that a 250% increase in spot size would occur as indicated by the theoretical curve for an ideal spherical holographic lens in FIG. 8a. These are relatively large changes which are unacceptable for most focusing applications. For example, even a much smaller frequency variation due to a cavity mode hop, on the order of 0.2–0.4 nm, would shift the focal spot laterally three to six focal spot diameters, and defocus it by more than 15–35 μm to well outside the focal depth of field.

The holographic doublet of the present invention compensates for chromatic variation in the size, astigmatism and lateral position of the focal spot. The doublet comprises two, antisymmetric holographic elements H$^{f1}$ and H$^{f2}$ to compensate for the lateral focal position variation (FIG. 9a). H$^{f1}$ and H$^{f2}$ contain a deliberate spherical aberration to compensate for focal spot size variation. This aberration, which is associated with axicon or axilens elements, increases the focal depth, and, while it does not correct for the longitudinal chromatic dispersion, it reduces its effect by relaxing the tolerance on the focal distance.

The two holographic elements H$^{f1}$ and H$^{f2}$ are produced at 488 nm in accordance with the methods described herein and incorporate an astigmatic correction for a commercial diode laser operating at 820 nm. The effectiveness of the holographic doublet is discussed hereinbelow in Example III by focusing a multimode laser-diode beam to a near-diffraction-limited 1/e$^2$ spot width.

It has been generally established that a holographic optical element (HOE) with a grating function:

$$\Phi_{axi}(r) = \frac{\pi}{\lambda_c} \cdot \frac{r^2}{f_0 + \frac{\delta z}{\rho^2} r^2} \approx \frac{\pi}{\lambda_c} \cdot \frac{r^2}{f_0} \left(1 - \frac{\delta z}{\rho^2} r^2 \right), \quad (9)$$

achieves an extended focal depth $\delta z$. Here $\lambda_c$ is the readout wavelength, r is the radial coordinate in the plane of the hologram, $f_o$ is the focal length, p is the aperture radius, and the restriction $\delta z < f_o$ applies. The focal length itself is a function of the wavelength, so for a small wavelength deviation, $\delta\lambda$, the focal length becomes $$f(\lambda_c + \delta\lambda) \approx f_o \left(1 - \frac{\delta\lambda}{\lambda_c}\right).$$

Therefore the desired focal depth of a HOE for readout over a spectral width of $\delta\lambda$ is $$\delta z = \frac{\delta\lambda}{\lambda_c} \cdot f_0. \quad (10)$$

Combining Eqs.(9) and (10) we find $\phi_{axi}$ differs from the grating function of a HOE with aspherical beam output, ($\phi_{sph} = \pi r^2/\lambda_c f_o$), by:

$$\Phi_{sph} - \Phi_{axi}(r) = \frac{\pi}{\lambda_c{}^2} \cdot \frac{r^4}{f_o\rho^2} \delta\lambda \equiv \frac{\pi}{4\lambda_c} \cdot \Delta_0 \, r^4. \quad (11)$$

Therefore to fabricate the desired axilens, holograms H$^{f1}$ and H$^{f2}$, are recorded with $R_c = f_o$ and a distortion $\Delta_o$, which is in the form of the third-order spherical aberration. FIG. 8a shows the superior chromatic performance of such an axilens as described below.

To demonstrate the present invention, two HOEs, H$^{f1}$ and H$^{f2}$ were fabricated using the recursive holographic recording technique described above. This method could, in principle, accommodate the desired axilens aberration by specifying the third-order spherical aberration, $S_3 = \Delta_o$. Alternatively, the required spherical aberration may be inserted by deforming the parent reference beam $\Phi_r^{\prime\prime}$ with a spherically aberrated lens that comprises a planoconvex lens inserted such that the convex side was positioned towards the focal point. Therefore the design parameters set forth above (which are suitable for a commercial laser diode: Sony SLD 202V) were used, and the desired value for $\delta\lambda$ was included:

$$R_c = 40 \text{ mm}, \beta_i = 50°, \Delta_A = 25 \text{ μm}, \lambda_o = 488 \text{ nm},$$
$$\lambda_c = 820 \text{ nm}, \delta\lambda = 5 \text{ nm}, \quad (12)$$

where $\beta_i$ is the output diffraction angle, $\Delta_A$ a correcting astigmatism.

The first doublet element, $H^{f1}$, was recorded to achieve the parameters of Eq.(12). The second element $H^{f2}$ was recorded to exhibit no astigmatism, that is with $\Delta_A = 0$. Both elements had an effective aperture of 10 mm and approximately 65% diffraction efficiency (coupled-wave theory predicts 97% efficiency for the plates used here: 7 μm emulsion thickness and 0.04 index modulation). The two holograms $H^{f1}$ and $H^{f2}$ were essentially identical except for the secondary effects of astigmatism in $H^{f1}$. Therefore when placed to diffract in an antisymmetric configuration as depicted in FIG. 9a, any diffraction angle changes due to variations in the incident wavelength are compensated by a corresponding change in the diffraction angle of $H^{f2}$. The doublet elements were conveniently spaced by 15 mm to prevent zero-order light from entering the aperture of $H^{f2}$. Significantly, considering the divergence of the zero order of $H^{f1}$, it is diffuse at the focus, and in view of the potential for elements with high diffraction efficiencies, the doublet spacing may be minimized such that $H^{f1}$ and $H^{f2}$ could be placed in contact or even on the opposite sides of a glass plate such as the window of a laser diode device as is depicted in FIG. 9b.

A spherical Ti:sapphire laser beam was used to evaluate the doublet ($H^{f1}$ and $H^{f2}$) and the performance of $H^{f1}$ by itself. To allow direct comparison to the doublet's focus, the collimated output of $H^{f1}$ is focused by a well-corrected, refractive achromat (focal length 50 mm). In contrast to the single $H^{f1}$, the doublet shows no chromatic variation in lateral focal position (FIG. 6). Both systems incorporate an axilens aberration and therefore exhibit minimal spot-size variation over a 4–5 nm band (FIG. 8a), and for both the focal length varies considerably with wavelength. However, if refocusing is conducted, the focal spot of the doublet is almost unaffected over a band of 100 nm (FIG. 8b). FIG. 10a shows the extended focal depth of the doublet (experimental points and theoretical curve), as compared to the shorter focal depth of an ideal spherical hologram (dashed line). The theoretical curves in FIGS. 8a and 10a derive from a Fraunhofer diffraction model propagated from the Gaussian width of the input Ti:sapphire beam (1.56 mm); curves for the axilens and spherical HOEs are calculated with and without the design axilens aberration $\Delta_o$, respectively.

Example III. Polychromatic Performance

To demonstrate the doublet's achromatic performance, it was employed to focus a multimode laser-diode beam (Sony SLD 202 V) with over thirty active modes. The resulting beam is well corrected for lateral focal position and the focal $1/e^2$ power width is close to the diffraction limit (FIG. 10b). The residual dependence of the focal length on wavelength distributes the foci of the diode's modes, which are separated by 0.32 nm, along the optical axis, so the overall focal depth appears to extend to nearly a millimeter (FIG. 11). Interestingly, very small broadening of the $1/e^2$ power width occurs for the multimode beam focus. This is verified by incoherent superposition of the single-frequency focal distribution (solid curve in FIG. 10a) for the thirty diode modes (solid curve in FIG. 10b), each weighted with its relative power and each appropriately shifted along the z-axis.

Example IV. HOE Arrays

Many applications will exist for arrays of HOE's of the present invention, including both the single and the multiple element embodiments. A typical application is depicted in FIG. 12 wherein a light source or source array input 60 is manipulated by an array 70 of HOE's to obtain the desired patterns on one or more output devices 82. Each HOE in the array may be of a single or multiple element design as described hereinabove. In the latter case the HOE arrays may be manufactured on separate substrates and the separation distance subject to design considerations mentioned above. Alternatively the multiple elements may be integrated on a single medium.

One class of applications for the HOE arrays calls for arrays of identical HOE's each capable of manipulating a single input beam to a single output element. Such arrays could readily be fabricated by repeatedly shifting the intermediate holograms to impress the same holographic pattern in the various locations of the array. In these applications the HOE array can be used to collimate an array of diodes or improve the fill factor in a detection array. In a different class of systems each HOE in the array could direct its output to several output elements, by incorporating several multiplexed diffractive patterns. This alternative can be generalized to incorporate arrays of dissimilar HOE's and would be useful for applications such as optical interconnects, optical computing and neural networks.

It is therefore to be understood that the present invention includes an astigmatism-correcting HOE doublet with chromatic correction for spot size, lateral focal shift and astigmatism. The predicted and the empirical properties of the design agree, including an extended focal depth, a broad operational spectrum and a near-diffraction-limited focal spot. The lateral position and spot-size of the focus are maintained over a band exceeding 120 nm, although the focal length varies by −0.1 mm per nanometer wavelength change. This combined lateral achromatic and longitudinal color properties of the doublet focus a multimode laser diode to a near-diffraction-limited $1/e^2$ power spot width extending to almost a millimeter. The proposed doublet design offers a compact, low-aberration, high-efficiency system, which has many potential applications. Its photographic recording process and analytical design procedure make it suitable for mass production while facilitating retooling to meet different requirements.

Those skilled in the art will recognize that various modifications may be made to the preferred embodiments disclosed hereinabove. For example, it is within the contemplation of the inventors that multiple holographic element devices for various purposes may be created that utilize more than the two holographic elements described in the holographic doublet embodiment hereinabove. The beam controlling properties of the multiple holographic element devices can therefore be designed to accurately control various parameters of the incident beam.

It is also contemplated by the inventors that other devices, such as refractive lenses, may be utilized to insert controlled aberrations in the parent object and/or reference beams in order to obtain the desired beam correction effects in the holographic element Hf, as described in Example 2 hereinabove. Furthermore, the number of steps and/or parent holographic elements that are utilized to form the final holographic element $H^f$ may be more, or perhaps even less than those described in the preferred embodiment. The number of steps or parent holograms is therefore not comidered to be the primary novel feature of the present invention; but rather, constitutes merely the preferred embodiment. Likewise, while the preferred method for creating the final holographic element $H^f$ is taught herein as constituting the use of parent holographic elements in a transmission mode, it is within the contemplation of the inventors that parent holographic elements utilized in a reflection mode could easily be substituted therefor; and likewise, that the final holographic element $H^f$ can be constituted as a transmission hologram or a reflection hologram.

In the examples of the preferred embodiments described herein, the volume phase holographic medium that has been utilized to create the final holographic elements was a bleached silver halide emulsion, as is well known to those in the field. However, the present invention can also be practiced utilizing other holographic media, such as dichromated gelatin, photorefractive materials, and photopolymers. Additionally, while the preferred embodiment described hereinabove has utilized parent and final holographic elements comprising flat surfaces having a holographic media disposed thereon, the utilization of curved surfaces for these holographic elements is within the contemplation of the inventors. The holographic elements of the present invention may be particularly designed to be disposed on a curved surface of a lens.

As stated above, a significant novel feature of the present invention is that high-quality holographic media which is in general limited to the blue-green spectral range is utilized to create holographic elements which are suitable for diffracting electromagnetic energy that is not within that spectral range. Furthermore, while the specific examples set forth in the specification teach the diffraction of electromagnetic energy having a wavelength $\lambda_c$ equal to 820 nanometers, it is within the contemplation of the inventors that the present invention can be utilized to diffract electromagnetic energy having any arbitrary wavelength.

While the present invention has been described above in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for fabricating a holographic element having the capability of diffracting a beam of electromagnetic energy having a wavelength $\lambda_c$, said capability being impressed in the holographic element with electromagnetic energy having a wavelength $\lambda_o$, comprising the steps of:

forming an object beam to have an aspherical wavefront, said object beam having a wavelength $\lambda_o$;
    forming a reference beam to have an aspherical wavefront, said reference beam having a wavelength $\lambda_o$;
    wherein at least one of said steps of forming said object beam and forming said reference beam includes the further step of utilizing at least one parent holographic element therein, said parent holographic element being recorded with a spherical parent object beam and a spherical parent reference beam and wherein said object beam is formed utilizing at least one parent reconstruction beam having a spherical wavefront, said parent reconstruction beam being formed with a different radius of curvature than either of said parent object beam or said parent reference beam;
    aligning said object beam and said reference beam;
    impressing a holographic pattern from said object beam and said reference beam within said holographic element, whereby said holographic element is usable to diffract a beam of electromagnetic energy having a wavelength $\lambda_c$ in a desired manner.

2. A method as described in claim 1 wherein said at least one parent reconstruction beam is directed at a different angle of incidence than an angle of incidence of either of said parent object beam or said parent reference beam.

3. A method for fabricating a holographic element having the capability of diffracting a beam of electromagnetic energy having a wavelength $\lambda_c$, said capability being impressed in the holographic element with electromagnetic energy having a wavelength $\lambda_o$, comprising the steps of:

forming an object beam to have an aspherical wavefront, said object beam having a wavelength $\lambda_o$;
    forming a reference beam to have an aspherical wavefront, said reference beam having a wavelength $\lambda_o$;
    wherein at least one of said steps of forming said object beam and forming said reference beam includes the further step of utilizing at least one parent holographic element therein, said parent holographic element being recorded with a spherical parent object beam and a spherical parent reference beam and interim said reference because is formed utilizing at least one parent reconstruction beam having a spherical wavefront, said parent reconstruction beam being formed a different radius of curvature than either of said parent object beam or said parent reference beam;
    aligning said object beam and said reference beam;
    impressing a holographic pattern from said object beam and said reference beam within said hologrpahic element, whereby said holographic element is usable to diffract a beam of electromagnetic energy having a wavelength $\lambda_c$ in a desired manner.

4. A method for fabricating a holographic element as described in claim 1 or 3 wherein at least one of said parent holographic elements is recorded utilizing a beam reflection geometry.

5. A method for fabricating a holographic element as described in claim 1 or 3 wherein at least one of said parent holographic elements is read out utilizing a beam reflection geometry.

6. A method for fabricating a holographic element as described in claim 1 or 3 wherein said holographic element is recorded utilizing a beam reflection geometry.

7. A method for fabricating a holographic element as described in claim 1 or 3 wherein at least one of said parent holographic elements is fabricated on a planar substrate.

8. A method for fabricating a holographic element as described in claim 1 or 3 wherein at least one of said parent holographic elements is fabricating on a non-planar substrate.

9. A method as described in claim 1 wherein said step of aligning said object beam and said reference beam includes the steps of:
  forming a first intermediate holographic element and forming a second intermediate holographic element in a spatially fixed position relative to said first intermediate holographic element;
  creating said object beam utilizing said first intermediate holographic element; and
  creating said reference beam utilizing said second intermediate holographic element.

10. A method as described in claim 9 including the further steps of:
  copying a parent holographic element to form said first intermediate holographic element;
  copying another parent holographic element to form said second intermediate holographic element;
  utilizing an identical recording beam to achieve both said copying steps; and
  utilizing a conjugate of said recording beam to reconstruct said object beam and said reference beam from said first and second intermediate holographic elements, respectively.

11. A method as described in one of claims 1 or 3 wherein at least one of said parent spherical beams contains deliberate aberrations.

12. A method as described in claim 11 wherein at least one of said parent spherical beams is formed utilizing a refractive optical element.

13. A method as described in claim 1 wherein said step of forming said reference beam includes the further step of utilizing at least one parent reconstruction beam having a spherical wavefront, said parent reconstruction beam being formed with a different radius of curvature than either of said parent object beam or said parent reference beam.

14. A method as described in one of claims 3 or 13 wherein said at least one parent reconstruction beam is directed at a different angle of incidence than the angle of incidence of either of said parent object beam or said parent reference beam.

15. A method for manipulating a beam of electromagnetic energy having a wavelength $\lambda_c$ in a desired manner, utilizing a holographic element that has been formed with electromagnetic energy having a wavelength $\lambda_o$, comprising the steps of:
  forming an object beam to have an aspherical wavefront, said object beam having a wavelength $\lambda_o$;
  forming a reference beam to have an aspherical wavefront, said reference beam having a wavelength $\lambda_o$;
  wherein at least one of said steps of forming said object beam and forming said reference beam includes the further step of utilizing at least one parent holographic element therein, said parent holographic element being recorded with a spherical parent object beam and a spherical parent reference beam, and wherein said object beam is formed utilizing at least one parent reconstruction beam having a spherical wavefront, said parent reconstruction beam being formed with a different radius of curvature than either of said object beam or said parent reference beam;
  aligning said object beam and said reference beam;
  impressing a holographic interference pattern from said object beam and said reference beam within said holographic element; and
  irradiating said holographic element with a reconstruction beam of electromagnetic energy having a wavelength $\lambda_c$, whereby said reconstruction beam is manipulated in a desired manner.

16. A method as described in claim 15 further including the further step of generating said reconstruction beam with a laser diode.

17. A method as described in claim 16 further including the step of engaging said holographic element to said laser diode.

18. A method as described in claim 17 further including the step of engaging said holographic element to an output window of said laser diode.

19. A method as described in claim 15 wherein said step of forming said reference beam includes the further step of utilizing at least one parent reconstruction beam having spherical wavefront, said parent reconstruction beam being formed with a different radius of curvature than either said parent object beam or said parent reference beam.

20. A method for manipulating a beam of electromagnetic energy, having a wavelength $\lambda_c$, in a desired manner, utilizing a holographic element that has been formed with electromagnetic energy having a wavelength $\lambda_o$, comprising the steps of:
  forming an object beam having an aspherical wavefront, said object beam having a wavelength $\lambda_o$;
  forming a reference beam having an aspherical wavefront, said reference beam having a wavelength $\lambda_o$;
  wherein at least one of said steps of forming said object beam and forming said reference beam includes the further step of utilizing at least one parent holographic element therein, said parent holographic element being recorded with a spherical parent object beam and a spherical parent reference beam, and wherein said reference beam is formed utilizing at least one parent reconstruction beam having a spherical wavefront, said parent reconstruction beam being formed with a different radius of curvature than either said parent object beam or said parent reference beam;
  aligning said object beam and said reference beam;
  impressing a holographic interference pattern from said object beam and said reference beam within said holographic element; and
  irradiating said holographic element with a reconstruction beam of electromagnetic energy having a wavelength $\lambda_c$, *whereby said reconstruction beam is manipulated in a desired manner.*

* * * * *